(12) United States Patent
Mann et al.

(10) Patent No.: US 6,339,752 B1
(45) Date of Patent: Jan. 15, 2002

(54) PROCESSOR EMULATION INSTRUCTION COUNTER VIRTUAL MEMORY ADDRESS TRANSLATION

(75) Inventors: George A. Mann, Phoenix; Bruce E. Hayden, Glendale, both of AZ (US)

(73) Assignee: Bull HN Information Systems Inc., Waltham, MA (US)

( * ) Notice: Subject to any disclaimer, the term of this patent is extended or adjusted under 35 U.S.C. 154(b) by 0 days.

(21) Appl. No.: 09/212,809

(22) Filed: Dec. 15, 1998

(51) Int. Cl.[7] .............................................. G06F 9/455
(52) U.S. Cl. ........................... 703/26; 703/27; 712/226; 712/227; 717/5
(58) Field of Search ..................... 395/500.47, 500.48, 395/705; 712/226, 227; 703/26, 27; 717/5

(56) References Cited

U.S. PATENT DOCUMENTS

| | | | | |
|---|---|---|---|---|
| 5,515,525 A | * | 5/1996 | Grynberg et al. | 395/500.48 |
| 5,560,013 A | * | 9/1996 | Scalzi et al. | 395/705 |
| 5,819,063 A | * | 10/1998 | Dahl et al. | 703/27 |
| 5,875,336 A | * | 2/1999 | Dickol et al. | 395/705 |
| 6,009,261 A | * | 12/1999 | Scalzi et al. | 395/500.47 |

OTHER PUBLICATIONS

Jacob et al, "Virtual Memory: Issues of Implementation", IEEE Computer Magazine, pp. 33–44 Jun. 1998.*
Bull HN Information Systems Inc. GCOS8 Operating System Programmers Guide–DPS 9000G Assembly Instructions, Mar. 1998, Preface iii to xi; pp. 3–1 to 3–24; 4–8, 4–11, 4–24 to 4–28; 4–32 to 4–34; 4–36 to 4–40; 4–50, 5–63 to 5–90.

* cited by examiner

Primary Examiner—Kevin J. Teska
Assistant Examiner—Samuel Broda
(74) Attorney, Agent, or Firm—B. E. Hayden; J. S. Solakian

(57) ABSTRACT

When emulating a Target architecture on a Host system having a different architecture, virtual-to-real address translation is typically expensive in terms of computer cycles. The cost for translating addresses for instruction fetches can be significantly reduced by maintaining both a virtual and a real memory address instruction counter. Both are incremented on each instruction fetch. Virtual to real address translation is eliminated as long as execution continues on the same real memory page of instructions. Alternatively, only a real memory address instruction counter is incremented, while maintaining a delta instruction counter value to efficiently translate back and forth to and from the corresponding virtual memory address.

19 Claims, 12 Drawing Sheets

PROCESSOR EMULATION INSTRUCTION COUNTER VIRTUAL MEMORY ADDRESS TRANSLATION

CROSS REFERENCE TO RELATED APPLICATION

This application is related to our copending patent applications assigned to the assignee hereof:

"DIFFERENT WORD SIZE MULTIPROCESSOR EMULATION" by David A. Egolf, filed Sep. 8, 1998, with Ser. No. 09/149,261, and "PROCESSOR EMULATION VIRTUAL MEMORY ADDRESS TRANSLATION" by David A. Egolf, filed of even date herewith, with Ser. No. 09/212,968.

FIELD OF THE INVENTION

The present invention generally relates to computer system emulation, and more specifically to instruction fetch optimization in emulation of a Target system utilizing a multiprocessor Host system.

BACKGROUND OF THE INVENTION

The cost of designing a computer processor continues to increase. Some computer architectures thus ultimately become uneconomical to implement directly, despite these architectures having significant installed bases.

One solution to this problem is to simulate (or emulate) one computer architecture on another computer architecture. Herein, the simulating (or emulating) computer architecture will be termed the "Host" computer system, while the simulated (or emulated) computer architecture will be termed the "Target" computer system. Emulators have been available almost since the advent of the first compilers.

One problem that arises in emulating one computer architecture on another involves address translation. In virtual memory computer systems, it is necessary to translate from operand and instruction virtual addresses to real memory addresses. In older computer systems, this translation was rudimentary. As computer technology progressed, this translation of virtual addresses to real addresses has continued to become ever more complicated.

Full virtual to real address translation typically consumes significant computer cycles, whether done in hardware, or in an emulator. When emulating a complex computer architecture, such as the GCOS® 8 architecture provided to customers by the assignee herein, full virtual to real address translation may take upwards of a hundred instructions to accomplish. The problem is compounded by the necessity to translate at least two virtual addresses per instruction executed for most instructions executed or emulated: one to fetch the instruction to execute, and a second one for the instruction operand.

Hardware implementations have addressed this complexity and sped up the virtual to real address translations with a number of hardware assists that have been developed over time. One such hardware assist is the use of look-aside buffers, where recent operand and instruction addresses, along with their virtual to real address translations, are maintained. Instead of immediately doing virtual to real address translations, a search is made first of the look-aside buffer. If the virtual page address has been recently translated, the corresponding real page address for the operand or instruction can be taken from the look-aside buffer. This eliminates the repeated need for expensive virtual to real address translation. This ability to test or compare a number of addresses in parallel in hardware is well understood in the prior art, and is one of the fundamental bases for N-way set associative cache memories.

Software emulations typically cannot take advantage of this look-aside buffer strategy since Host systems seldom supply general-purpose associative memory capabilities. Instead, they must resort to a costly search to implement the same strategy. A pragmatic result is that an implementation which performs the full address development is in many cases cheaper than implementing the look-aside buffer technique.

When virtual to real address translation is done in software in an emulator, it is typically not possible on a Single Instruction/Single Data (SISD) processor to test or compare the virtual page address being translated against more than one previous virtual page address at a time. Thus, the previous virtual page addresses in the look-aside buffer would have to be tested sequentially. The result of this constraint is that it is often as expensive, or maybe even more expensive, in terms of computer cycles to utilize a look-aside buffer for caching virtual to real address translations as compared to performing full address translation for each address utilized.

It would thus be advantageous to be able to efficiently translate virtual to read addresses in an emulator. An efficient method of performing this address translation would significantly reduce the cost of emulating one (Target) computer system utilizing a second (Host) computer system.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Emulating a first computer architecture on a second computer architecture is a well known technique in the area of data processing. It is becoming more common as the cost of developing new generation computer architectures continues to escalate. A program, called an "emulator", on a data processing system with the second computer architecture executes code designed for the first computer architecture: in essence pretending that it has the first computer architecture. The computer system having the second computer architecture and that executes the emulator program is termed the "Host" computer system. A virtual computer system having the first ("emulated") computer architecture is termed the "Target" system. Often both Target user and operating system software is executed together by the emulator on the Host system, with the Target operating system managing resources for the Target user programs.

The GCOS® 8 data processing system has a complex 36-bit word architecture. In the preferred embodiment, a Target GCOS 8 computer system is emulated on a Host computer system having a different word size. In that preferred embodiment, the Host computer system has a 64-bit word size. One such Host computer architecture having a 64-bit word size is the Intel Merced architecture. However, other Host and Target architectures are within the scope of this invention.

Figure 1:
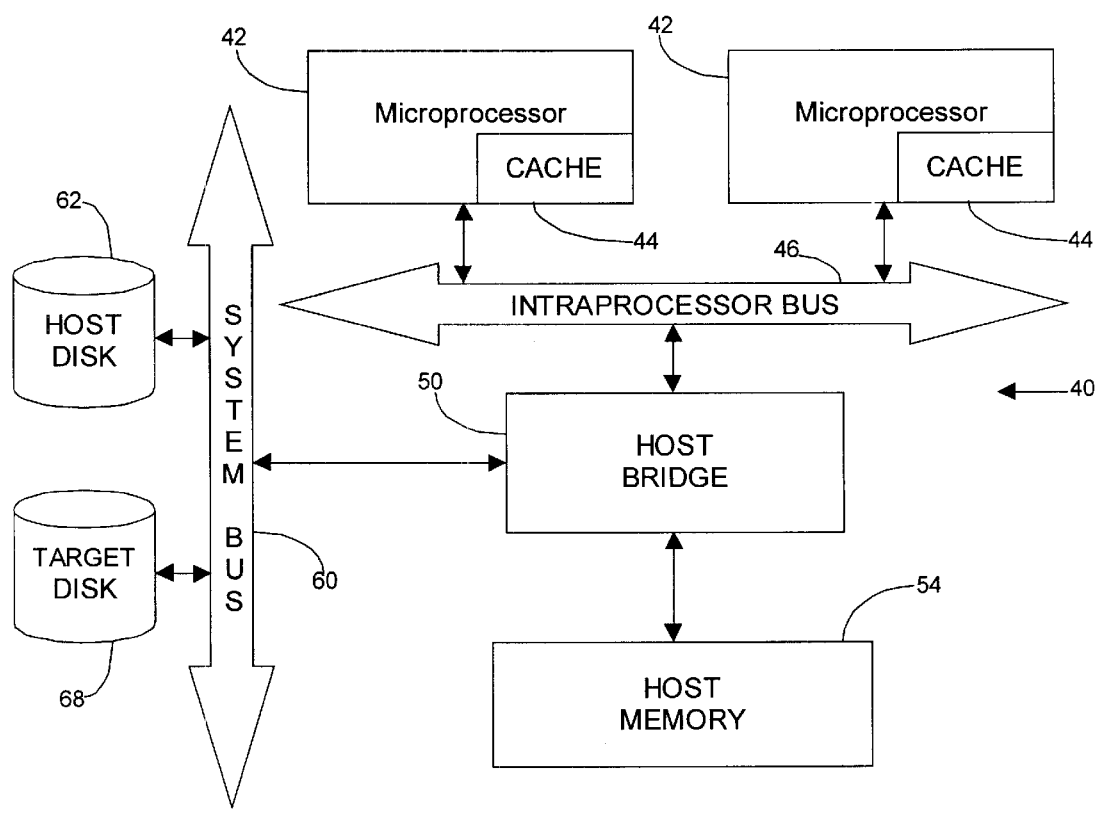
FIG. 1 is a block diagram illustrating a multiprocessor Host system utilized to emulate a Target system with a narrower word size, in accordance with the present invention.

FIG. 1 is a block diagram illustrating a multiprocessor Host system utilized to emulate a Target system with a narrower word size. In the preferred embodiment, the Host system utilizes 64-bit words, whereas the Target system supports 36-bit words. A multiprocessor system is shown in order to provide the level of performance necessary to emulate large-scale enterprise level Target systems. The multiprocessor system 40 shows two (2) microprocessors 42, each containing its own local cache memory 44. Some examples of microprocessors include Pentium II and Merced microprocessors from Intel Corporation, PowerPC microprocessors from Motorola, Inc. and IBM, and SPARC processors from Sun Microsystems. The cache memory 44 is typically implemented as extremely high-speed static random access memory (SRAM). The cache memory 44 may be implemented on the same semiconductor die as the microprocessor 42, or may be implemented as part of a multi-chip-module (MCM) with the microprocessor 42. In any case, the cache memory 44 for each microprocessor 42 is dedicated to that microprocessor 42. Note here that a single level of cache memory 44 is illustrative. Other cache memory configurations are within the scope of this invention. Note also that two microprocessors are shown. This is for illustrative purposes, and it is understood that this invention envisions emulating a multiprocessor Target system on either a single processor or a multiprocessor Host system.

The two shown microprocessors 42 are coupled by and communicate over an intraprocessor bus 46. One of the functions of this intraprocessor bus 46 is to allow the two microprocessors 42 to communicate sufficiently so as to maintain coherence between their respective cache memories 44. A single bus has been shown. However, multiple busses are also within the scope of this invention.

Also coupled to the intraprocessor bus 46 is a Host bridge 50. This provides communications between the microprocessors 42 and the remainder of the computer system 40. Coupled to the Host Bridge 50 is Host memory 54. This is typically Dynamic Random Access Memory (DRAM). However, other types of memory may be utilized, including SRAM. Host memories 54 typically contain several orders of magnitude more memory than the cache memories 44.

Also coupled to the Host Bridge 50 is a system bus 60. The system bus 60 is utilized to couple the system 40 to lower speed peripheral devices. These lower speed peripheral devices can include display monitors, keyboards, communications devices, and the like (not shown here). Also coupled to the system bus are disk drives and other forms of storage capable of permanently storing data for the computer system 40. Shown in this figure are a Host disk drive 62 and a Target disk drive 68. The Host disk drive 62 typically contains the software required to emulate the Target system on the Host system. The Target disk drive 68 contains the software being emulated. It should be noted that the Host disk drive 62 is shown distinct from the Target disk drive 68. Additionally, only a single Host disk drive 62 and Target disk drive 68 are shown. It is shown this way for illustrative purposes. However, the present invention also envisions combining the two on shared drives. It must also be noted that the Target disk drive 68 will often actually consist of a large number of different physical disk drives. This is especially true when Host systems capable of supporting enterprise level databases are emulated.

Memory is considered herein a relatively high speed machine readable medium and includes Volatile Memories, such as DRAM 54, and SRAM 44, and Non-Volatile Memories (not shown) such as, ROM, FLASH, EPROM, EEPROM, and bubble memory. Secondary Storage 62, 68 includes machine-readable media such as hard disk drives, magnetic drum, and bubble memory. External Storage (not shown) includes machine-readable media such as floppy disks, removable hard drives, magnetic tape, CD-ROM, and even other computers, possibly connected via a communications line. The distinction drawn here between Secondary Storage 62, 68 and External Storage is primarily for convenience in describing the invention. As such, it should be appreciated that there is substantial functional overlap between these elements. Computer software such as Target emulation software and user programs can be stored in a Computer Software Storage Medium, such as Memory 44, 54, Secondary Storage 62, 68, and External Storage. Executable versions of computer software can be read from a Non-Volatile Storage Medium such as External Storage (not shown), Secondary Storage 62, 68, and Non-Volatile Memory (not shown), and loaded for execution directly into Volatile Memory 44, 54, executed directly out of Non-Volatile Memory 44, 54, or stored on the Secondary Storage 62, 68 prior to loading into Volatile Memory 44, 54 for execution.

Virtual memory provides a processor with an apparent or virtual memory address space much larger than the real memory actually employed. It also allows provides a contiguous address space employing discontiguous real memory pages. In the GCOS® 8 environment, this capability consists of a directly addressable virtual space of 2**43 bytes and the mechanisms for translating this virtual memory address into a real memory address.

In order to provide for virtual memory management, assignment, and control, the 243-byte virtual memory space is divided into smaller units called working spaces and segments. The 243 bytes of virtual memory space are divided into 512 234 byte working spaces (WS). Each WS has a unique WS number (WSN). These working space numbers are used to generate a particular virtual memory address. They are obtained indirectly from one of the eight 9-bit WS registers, or directly from one of the descriptor registers. Note that in XV mode, WSNs are 18 bits long, resulting in 256 k word working spaces. Each working space is further broken into 222 1024 (210)-word or 4096 (1012)-byte virtual pages. Each virtual page, when present, will map to a physical or "real" page of the same size.

A segment is a part of a working space and may be as small as one byte or as large as 2**32 bytes for an extended segment. Thus, unlike the fixed size of a working space (WS), a segment size is variable. Segments are addressed by a 72-bit data item called a "descriptor" or a "segment descriptor". Segments can be viewed as "framing" a portion of a working space. Multiple segments may frame different portions of the same working space, and may even overlap. Typically segments are setup by the operating system, but may be shrunk by unprivileged user programs.

When a virtual address is generated, a portion of the information comes from a segment descriptor contained in a register such as the instruction segment register (ISR). For operands, the descriptor may be contained in other segment descriptor registers. The area of virtual memory constituting a segment is "framed" by its segment descriptor by defining a base value relative to the base of the working space and a bound value relative to the base of the segment.

For all memory accesses, a virtual address must be generated. This includes operand or descriptor loads and stores, as well as instruction fetches. The mechanics of generating the virtual memory address depends on whether the involved segment descriptor is a standard segment descriptor or a super segment descriptor. Thus the procedures described below for generating an operand virtual address with a standard segment descriptor also applies to virtual address generation for accessing the instruction, argument, parameter, and linkage segments, since the registers holding these segment descriptors can only contain standard segment descriptors (with the exception of the instruction segment register (ISR) which may alternatively contain extended descriptors in EI mode).

Figure 2:
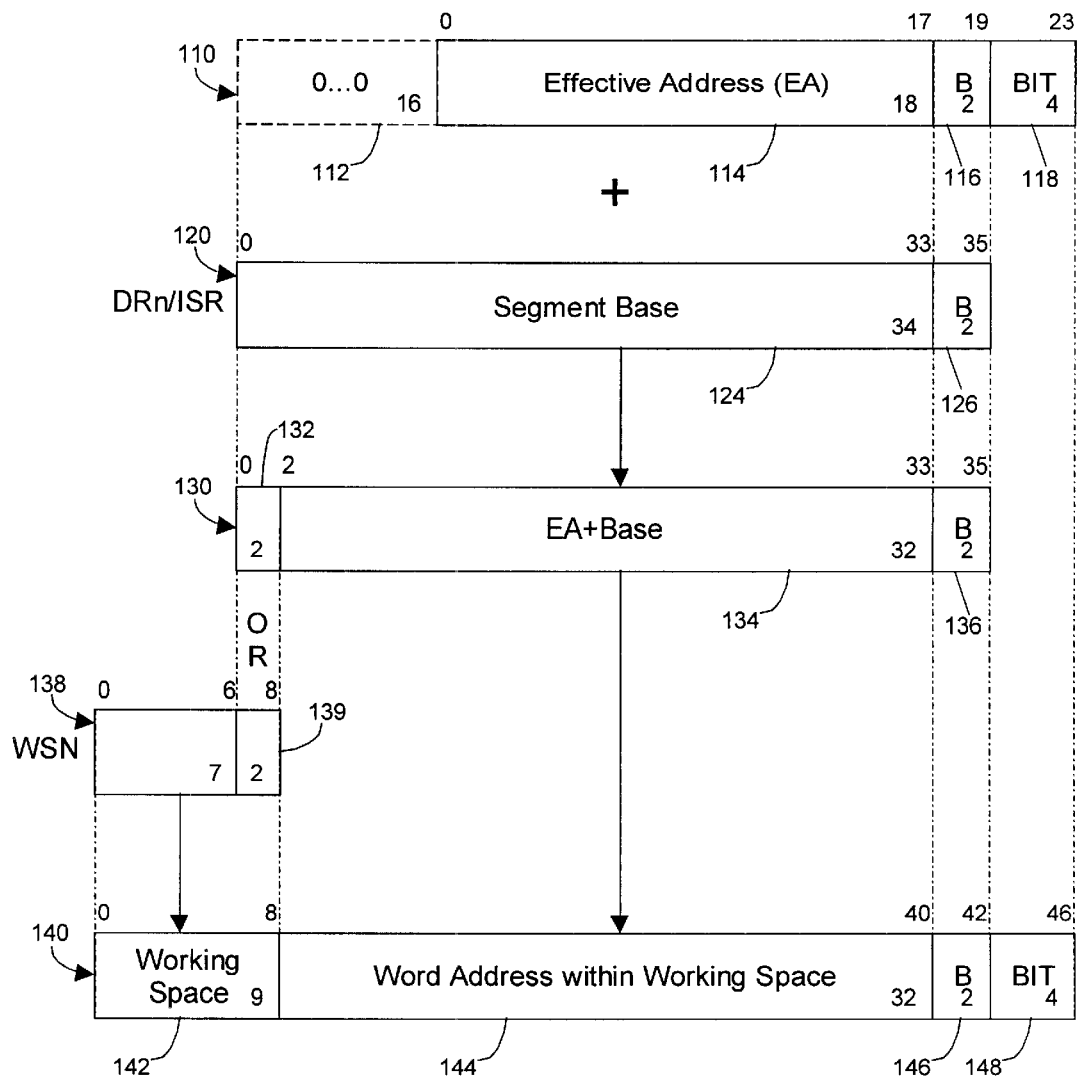
FIG. 2 is a block diagram illustrating virtual address generation using a standard segment descriptor in standard mode in a GCOS 8 system.

FIG. 2 is a block diagram illustrating virtual address generation using a standard segment descriptor in standard mode in a GCOS 8 system. The effective address (EA) 110 is typically generated during instruction execution. Typically, during each instruction cycle two different effective addresses 110 are generated: the address of the instruction to fetch for execution, and an instruction operand address. The virtual address generation shown here must be done for both. The effective address (EA) 110 is typically generated differently for different types of instructions and instruction modification types. For example, the effective address (EA) 110 may be loaded from memory, generated directly from the instruction, or be calculated as the sum of one or more registers and a constant. The GCOS 8 architecture also supports an indirect addressing mode that provides that an operand address specifies the address of an operand address, or the address of an address of an operand address, etc.

The Effective Address (EA) 110 in NS mode consists of four parts: sixteen leading zeroes 112; an 18-bit effective word address 114; a 2-bit byte offset within word 116; a 4-bit bit offset within byte 118. The Effective Address (EA) 110 is added to a segment base address 120. The segment base address 120 comprises: a segment word address 124; and a segment byte offset 126. The segment base address is provided from one of the system segment registers discussed further in FIGS. 11–14. The summation 130 of the effective address (EA) plus the segment base comprises: a 2-bit workspace modifier 132; a 32-bit word offset 134; and a 2-bit byte offset 136. The 2-bit workspace modifier 132 is ORed with the lower 2-bits 139 of a 9-bit workspace number 138 to generate an effective workspace number 142. A 47-bit virtual address 140 is then generated comprising: the effective 9-bit working space number 142; a 32-bit word address within working space 144; a 2-bit byte offset within word 146; and a 4-bit bit offset within byte 148, from: the workspace number 135 ORed with the workspace number in the EA+Base 132; the EA+Base 134; and the bit offset in the Effective Address 118. It should be noted here that since the vast majority of GCOS 8 instructions executed do not utilize the virtual memory bit offset 148, it can be efficiently carried separately from the remainder of the virtual address 140 for those rare cases where it is needed.

Figure 3:
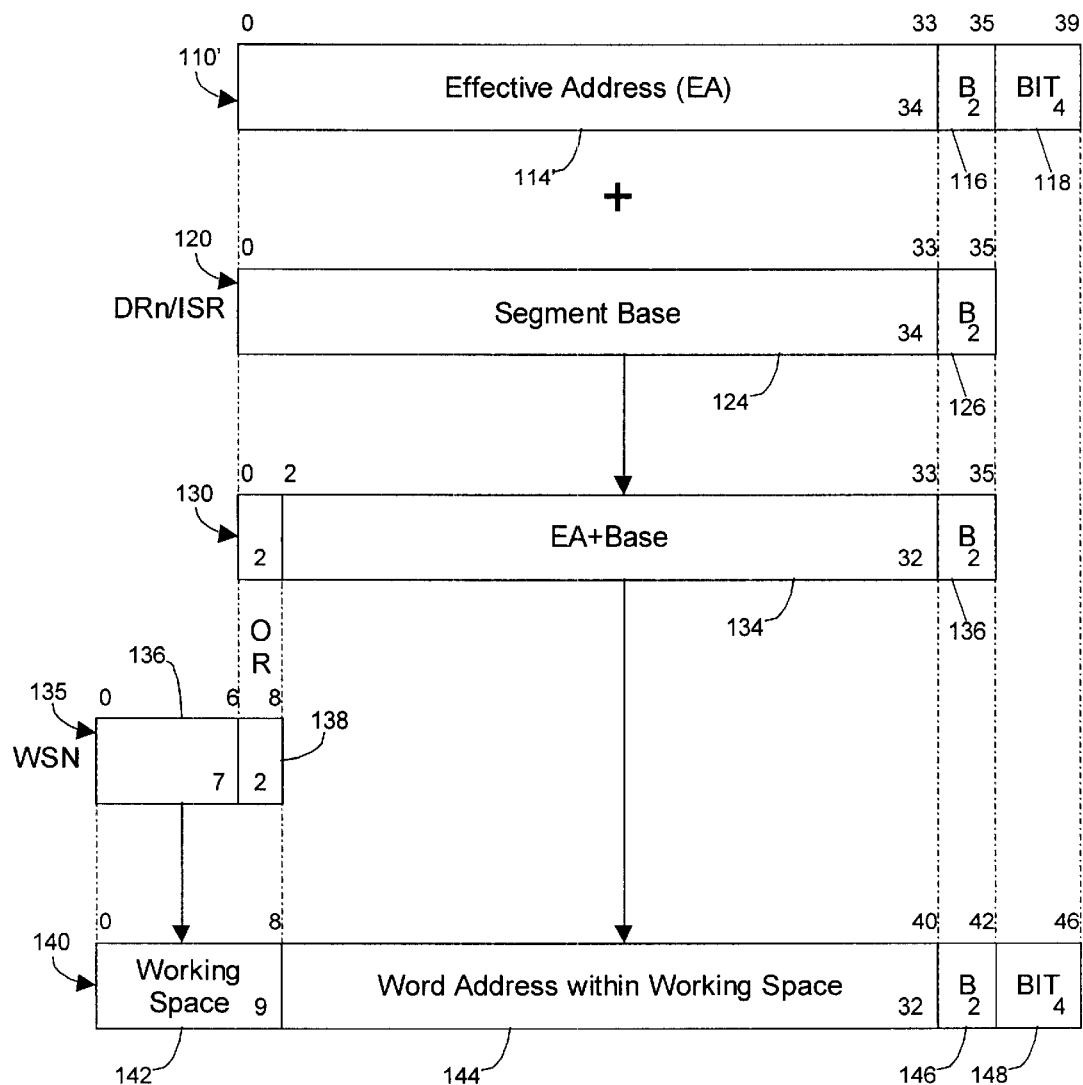
FIG. 3 is a block diagram illustrating address generation in ES or ESI mode in GCOS 8 computer systems.

FIG. 3 is a block diagram illustrating address generation in ES or ESI mode in GCOS 8 computer systems. It is identical to the address generation in FIG. 4 with the exception that a 34-bit effective word address 114' is utilized to form the effective address (EA) 110' instead of zero-filling an 18-bit effective word address 114 with sixteen zero bits to the left.

Figure 4:
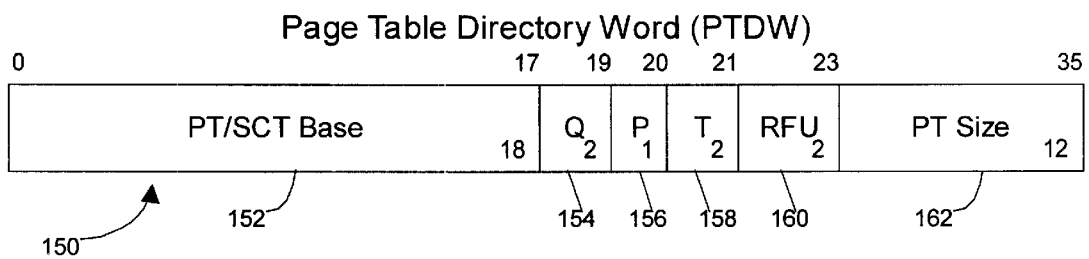
FIG. 4 is a diagram of the format of a page table directory word (PTDW) in the GCOS 8 architecture.

FIG. 4 is a diagram of the format of a page table directory word (PTDW) 150 in the GCOS 8 architecture. The format of a 36-bit page table directory word (PTDW) 150 is shown in table T-1:

TABLE T-1

Page Table Directory Word (PTDW) Format

| Ref | St | Ed | B# | Field Name | Field Description |
|-----|----|----|----|------------|-------------------|
| 152 | 00 | 17 | 18 | PT/SCT Base | Page table/Section table base |
| 154 | 18 | 19 | 2 | Q | Forces isolation of WS# |
| 156 | 20 | 20 | 1 | P | Presence bit: |
| | | | | | 0 - not present |
| | | | | | 1 - present |
| 158 | 21 | 22 | 2 | T | Type of page/section table: |
| | | | | | 00 - Dense page table |
| | | | | | 10 - Fragmented page table |
| | | | | | 01 - Section table |
| | | | | | 11 - Forces fault to occur |
| 160 | 23 | 23 | 1 | RFU | Reserved for Future Use |
| 162 | 24 | 35 | 12 | PT/SCT size | Size of PT/SCT |

The PCT/SCT base 152 is a modulo 1024 (2\*\*10) base address of a page table (PT) or section table (SCT). The PT/SCT size 162 field contains different information depending on the type of page table involved. For a dense page table (T=00), bits 24–35 indicate the modulo 64 size of the page table (PT). For a section table (T=01), bits 30–35 indicate the modulo 64 size of the SCT. Fragmented page tables (T=10) are not supported by the GCOS 8 operating system. If bits 30–35 are zero, a size of 64 words are assumed, and bits 24 through 29 are ignored.

Figure 5:
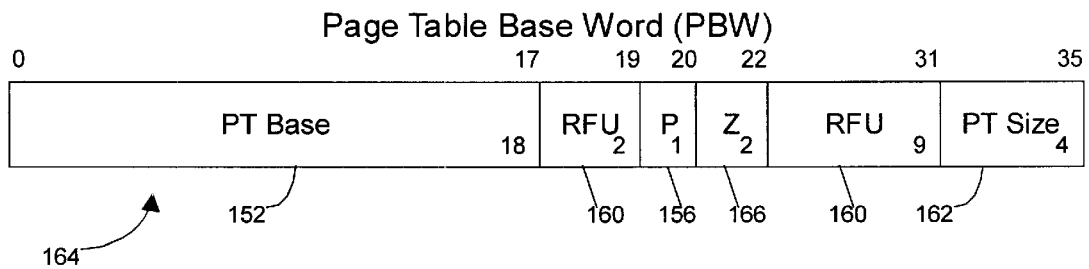
FIG. 5 is a diagram of the format of a page table base word (PBW) in the GCOS 8 architecture.

FIG. 5 is a diagram of the format of a page table base word (PBW) 164 in the GCOS 8 architecture. Page table base words (PBW) 164 are utilized to address page tables (PT) and are the entries in a section table (SCT). The format of a 36-bit page table base word (PBW) 164 is shown in table T-2:

TABLE T-2

Page Table Base Word (PBW) Format

| Ref | St | Ed | B# | Field Name | Field Description |
|-----|----|----|----|------------|-------------------|
| 152 | 00 | 17 | 18 | PT Base | Page table/Section table base |
| 160 | 18 | 19 | 2 | RFU | Reserved for Future Use |
| 156 | 20 | 20 | 1 | P | Presence bit: |
| | | | | | 0 - not present |
| | | | | | 1 - present |
| 166 | 21 | 22 | 2 | MBZ | Must be zero |
| 160 | 23 | 31 | 9 | RFU | Reserved for Future Use |
| 162 | 32 | 35 | 4 | PT size | Size of Page Table |

The PT base field 152 contains the modulo 1024 (2\*\*10) base address of a dense page table. The PT size field 162 contains the modulo 64 size of a dense page table. If it is zero, a page table size of 64 words is assumed.

Figure 6:
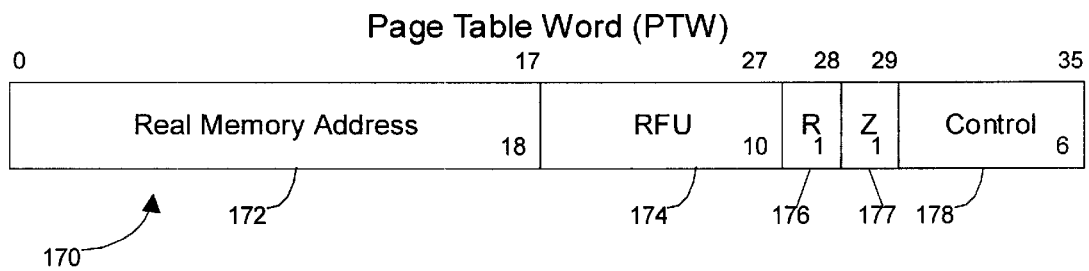
FIG. 6 is a diagram of the format of a page table word (PTW) in the GCOS 8 architecture.

FIG. 6 is a diagram of the format of a page table word (PTW) 170 and are the entries in a page table (PT) in the GCOS 8 architecture. Each page table word (PTW) 170 describes one page of real memory. The format of a 36-bit page table word (PTW) 170 is shown in table T-3:

TABLE T-3

Page Table Word (PTW) Format

| Ref | St | Ed | B# | Field Name | Field Description |
|-----|----|----|----|------------|-------------------|
| 172 | 00 | 17 | 18 | PT/SCT Base | Page table/Section table base |
| 174 | 18 | 27 | 10 | RFU | Reserved for Future Use |
| 176 | 28 | 28 | 1 | R | Reserved for Software |
| 177 | 29 | 29 | 1 | MBZ | Must be Zero |

TABLE T-3-continued

Page Table Word (PTW) Format

| Ref | St | Ed | B# | Field Name | Field Description |
|-----|----|----|----|------------|-------------------|
| 178 | 30 | 35 | 6 | Control | Control Field Bits: |
| | | | | | 30 - CPU page present |
| | | | | | 31 - Write permitted |
| | | | | | 32 - Housekeeping |
| | | | | | 33 - IO page present |
| | | | | | 34 - Page modified |
| | | | | | 35 - Page Accessed |

The PT/SCT base address contains the modulo 1024 (2\*\*10) base address of either a Page Table (PT) or a Section Table (SCT).

Figure 7:
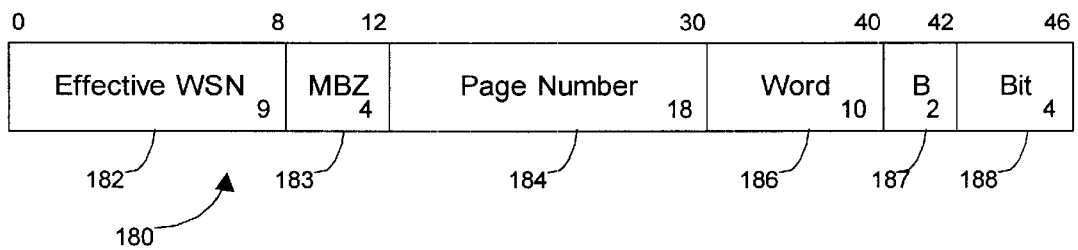
FIG. 7 is a diagram illustrating the format of a virtual address when addressing a workspace described by dense page tables.

FIG. 7 is a diagram illustrating the format of a virtual address when addressing a workspace containing dense page tables (PTDW 150 T field 158=00). The virtual address 180 contains: a 9-bit effective workspace number 182; 4-bit unused field that must be zero (MBZ) 183; an 18-bit page number 184; a 10-bit word offset within page 186; a 2-bit byte offset within word 187; and a 4-bit bit offset within byte 188. The virtual address 180 in this FIG. 7 corresponds to the virtual address 140 shown in FIGS. 2 and 3. As noted before, the vast majority of instructions executed in the GCOS 8 architecture do not utilize bit addressing. For that reason, in the preferred embodiment of the present invention, the bit offset 188 is maintained, when needed, separately from the remainder of the virtual address.

Figure 8:
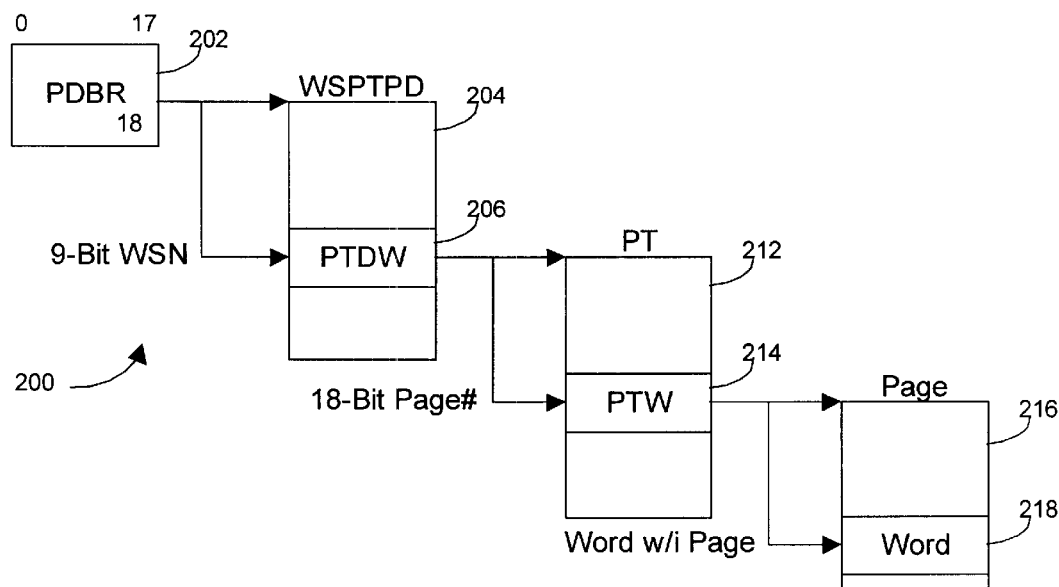
FIG. 8 is a block diagram that illustrates virtual address mapping using a dense page table in the GCOS 8 architecture and the virtual address mapping shown in FIG. 7.

FIG. 8 is a block diagram that illustrates virtual address mapping 200 using a dense page table in the GCOS 8 architecture. A page directory base register (PDBR) 202 contains a pointer to a Working Space Page Table Directory (WSPTPD) 204. The WSPTPD 204 contains Page Table Directory Words (PTDW) 150 (see FIG. 4). The effective working space number 182 is utilized to index into the WSPTPD 204 in order to select the appropriate PTDW 206. The selected Page Table Directory Word (PTDW) 206 in turn addresses a Page Table (PT) 212. Page Tables (PT) 212 contain Page Table Words 170 (see FIG. 6). The page number 184 portion of the virtual address 180 is utilized to index into the Page Table (PT) 212 to select the appropriate Page Table Word 214. The selected Page Table Word (PTW) 214 addresses one page of real memory. The word offset 186 portion of the virtual address 180 is then utilized to index into the selected page of memory 216 to address the selected word 218. The byte 187 and bit 188 offsets are then utilized to index into the selected word 218, when necessary.

Figure 9:
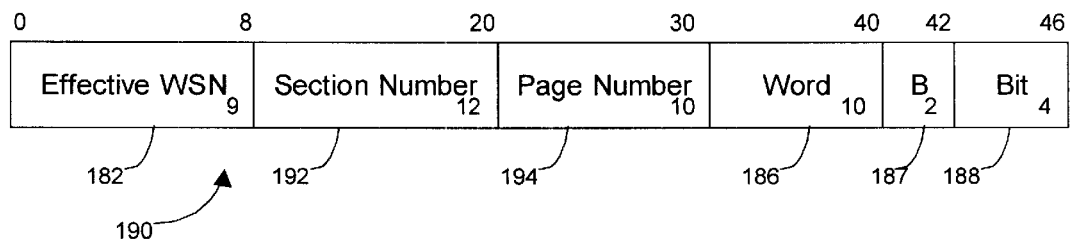
FIG. 9 is a diagram illustrating the format of a virtual address when addressing a workspace described by section tables.

FIG. 9 is a diagram illustrating the format of a virtual address when addressing a workspace containing section tables (PTDW 150 T field 158=01). The virtual address 190 contains: a 9-bit effective workspace number 182; a 12-bit section number 192; a 10-bit page number 194; a 10-bit word offset within page 186; a 2-bit byte offset within word 187; and a 4-bit bit offset within byte 188. The virtual address 190 in this FIG. 9 corresponds to the virtual address 140 shown in FIGS. 2 and 3.

Figure 10:
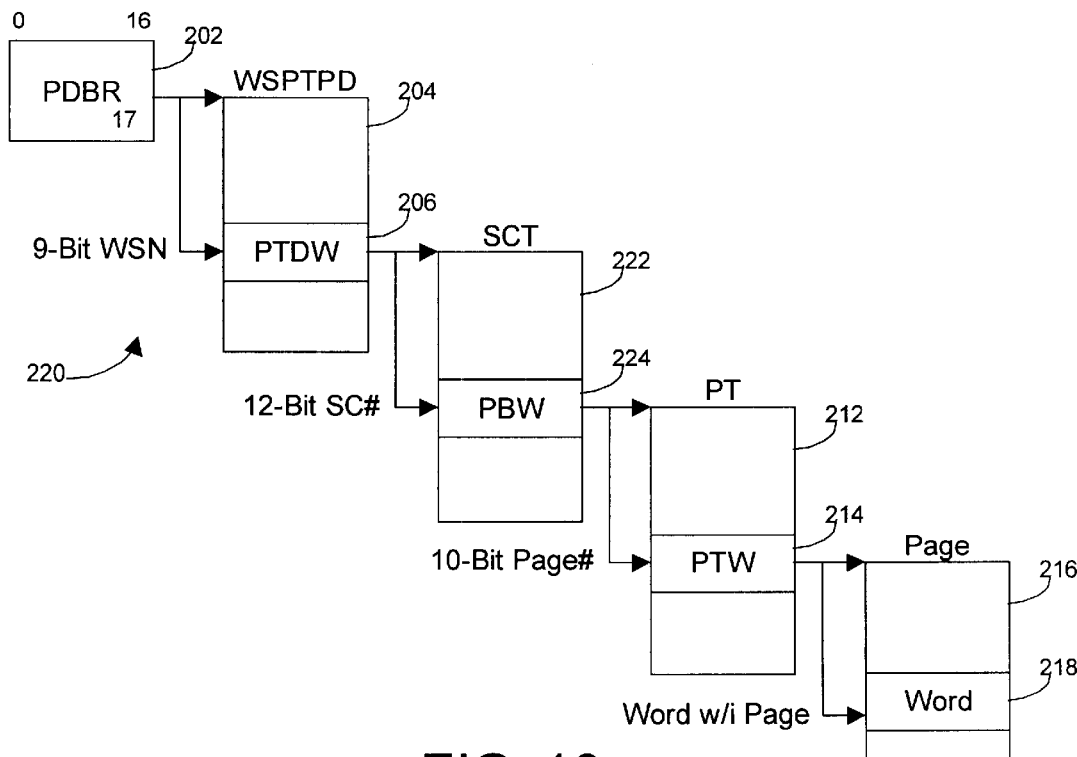
FIG. 10 is a block diagram that illustrates virtual address mapping using a section table in the GCOS 8 architecture and the virtual address mapping shown in FIG. 9.

FIG. 10 is a block diagram that illustrates virtual address mapping 220 using a section table in the GCOS 8 architecture using the virtual address format shown in FIG. 9. A page directory base register (PDBR) 202 contains a pointer to a Working Space Page Table Directory (WSPTPD) 204. The WSPTPD 204 contains Page Table Directory Words (PTDW) 150 (see FIG. 4). The effective working space number 182 is utilized to index into the WSPTPD 204 in order to select the appropriate PTDW 206. The selected Page Table Directory Word (PTDW) 206 in turn addresses a section table (SCT) 222. The section table (SCT) 222 contains Page Table Base Words (PBW) 164 (see FIG. 5). The section number 192 is utilized to index into the section table (SCT) 222 to address a Page Table Base Word (PBW) 224. The selected PBW 224 addresses a Page Table (PT) 212. Page Tables (PT) 212 contain Page Table Words 170 (see FIG. 6). The page number 194 portion of the virtual address 190 is utilized to index into the Page Table (PT) 212 to select the appropriate Page Table Word 214. The selected Page Table Word (PTW) 214 addresses one page of real memory. The word offset 186 portion of the virtual address 190 is then utilized to index into the selected page of memory 216 to address the selected word 218. The byte 187 and bit 188 offsets of the virtual address 190 are then utilized to index into the selected word 218, when necessary.

FIGS. 11 through 14 are diagrams that illustrate the contents of segment descriptor registers in a GCOS 8 environment. Thirteen segment descriptor registers are supported in the GCOS 8 architecture, and they are: eight Segment Descriptor Registers (DR0 through DR7) for operand addressing; an Argument Stack Register (ASR); a Data Stack Descriptor Register (DSDR); an Instruction Segment Register (ISR); a Linkage Segment Register (LSR); and a Parameter Segment Register (PSR). In the GCOS 8 environment, segment descriptors are 72-bits in size and are used to describe a contiguous subset of a working space.

Figure 11:
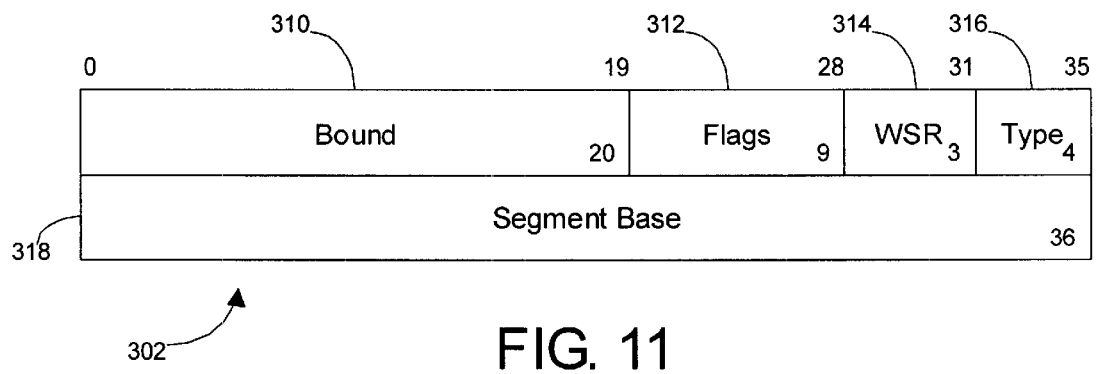
FIGS. 11 through 14 are diagrams that illustrate the contents of segment descriptor registers in a GCOS 8 environment.

FIG. 11 is a diagram illustrating the segment register representation of a standard segment descriptor. The segment register representation 302 comprises two 36-bit words stored in two words of memory or in a single 72-bit register. The format of the segment register representation is shown in table T-4:

TABLE T-4

Standard Segment Descriptor 302 Format

| Ref# | Wd | St | Ed | B# | Field Name | Field Description |
|------|----|----|----|-----|------------|-------------------|
| 310 | 0 | 00 | 19 | 20 | Bound | Segment upper bound |
| 312 | 0 | 20 | 28 | 9 | Flags | Flags: |
|  |  |  |  |  |  | 20 - Read allowed |
|  |  |  |  |  |  | 21 - Write allowed |
|  |  |  |  |  |  | 22 - Store by STDn allowed |
|  |  |  |  |  |  | 23 - Cache use control |
|  |  |  |  |  |  | 24 - NS/ES mode |
|  |  |  |  |  |  | 25 - Execute allowed |
|  |  |  |  |  |  | 26 - Privilege required |
|  |  |  |  |  |  | 27 - Bound valid |
|  |  |  |  |  |  | 28 - Segment available |
| 314 | 0 | 29 | 31 | 3 | WSR | Working Space Register |
| 316 | 0 | 32 | 35 | 4 | Type | Segment Descriptor Type |
|  |  |  |  |  |  | 0 - frames operand space |
|  |  |  |  |  |  | 1 - frames descriptor space |
|  |  |  |  |  |  | 12 - extended descriptor |
| 318 | 1 | 0 | 35 | 36 | Base | Segment Base Address |

The 3-bit Working Space Register (WSR) 314 field designates one of eight 9-bit working space registers. The contents of the selected WSR 314 are retrieved and used as the working space for the segment. The 20-bit bound field 324 contains the maximum valid byte address within the segment. The 36-bit base field 318 contains a virtual byte address that is relative to the start of the designated working space defined by the WSR 314. Bits 0:33 are a 34-bit word address, and bits 34:35 identifying a 9-bit byte within the word.

Figure 12:
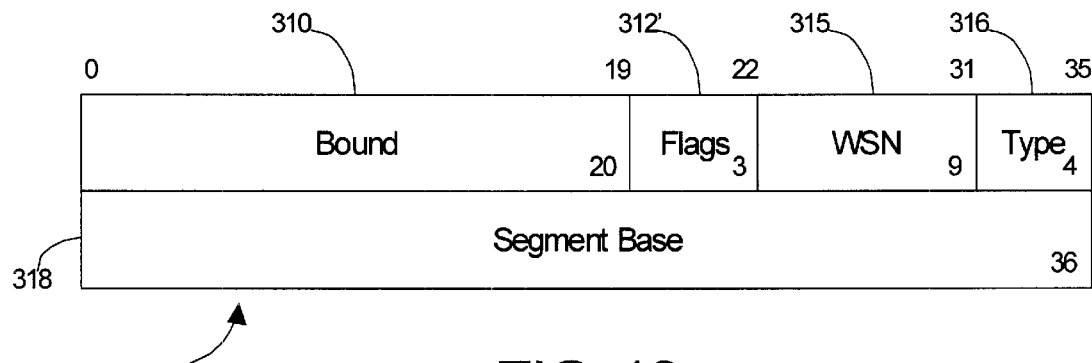

FIG. 12 is a diagram illustrating the segment register representation of a standard segment descriptor with working space number. The segment register representation 304 comprises two 36-bit words stored in two words of memory or in a single 72-bit register. The format of the segment register representation is shown in table T-5:

TABLE T-5

Standard Segment Descriptor 304 Format

| Ref# | Wd | St | Ed | B# | Field Name | Field Description |
|------|----|----|----|-----|------------|-------------------|
| 310 | 0 | 00 | 19 | 20 | Bound | Segment upper bound |
| 312' | 0 | 20 | 22 | 3 | Flags | Flags: |
|  |  |  |  |  |  | 20 - Read allowed |
|  |  |  |  |  |  | 21 - Write allowed |
|  |  |  |  |  |  | 22 - Store by STDn Allowed |
| 315 | 0 | 23 | 31 | 9 | WSN | Working Space Number |
| 316 | 0 | 32 | 35 | 4 | Type | Segment Descriptor Type |
|  |  |  |  |  |  | 2 - frames operand space |
|  |  |  |  |  |  | 3 - frames descriptor space |
|  |  |  |  |  |  | 14 - extended descriptor |
| 318 | 1 | 0 | 35 | 36 | Base | Segment Base Address |

The descriptor format 304 shown in FIG. 12 is identical to the descriptor format 302 shown in FIG. 11 with the exception that it includes a work space number 315 instead of a work space register number 314. In evaluating the descriptor in FIG. 11, the corresponding working space register is accessed to provide the 9-bit working space number, whereas in FIG. 12, the 9-bit working space number is loaded directly from the descriptor. The first 3-bits of flags 312, 312' are identical between the two formats of segment descriptors 302, 304. The remaining 6-bits of flags 312 from standard segment descriptors 302 containing a working space register 314 field are set to standard values in standard descriptors 304 containing a working space number 315 field.

Figure 13:
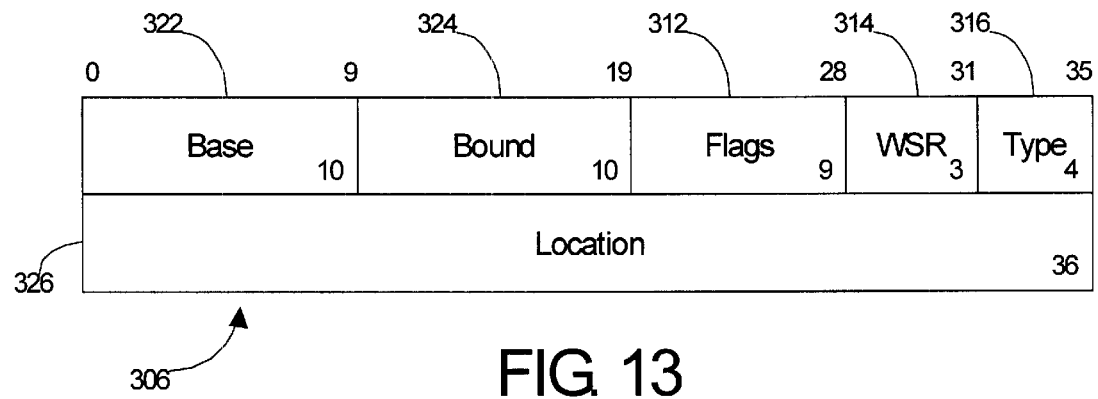

FIG. 13 is a diagram illustrating the segment register representation of a super segment descriptor. Super segment descriptors are utilized for segments larger than 256 k (218) words. The base 322 and bound 324 values are MOD 64 k (216) words. The segment register representation 306 comprises two 36-bit words stored in two words of memory or in a single 72-bit register. The format of the segment register representation is table T-6:

TABLE T-6

Super Segment Descriptor 306 Format

| Ref# | Wd | St | Ed | B# | Field Name | Field Description |
|------|----|----|----|-----|------------|-------------------|
| 322 | 0 | 00 | 09 | 10 | Base | Base address of segment |
| 324 | 0 | 10 | 19 | 10 | Bound | Upper bound of segment |
| 312 | 0 | 20 | 28 | 9 | Flags | Flags |
| 314 | 0 | 29 | 31 | 3 | WSR | Working Space Register |
| 316 | 0 | 32 | 35 | 4 | Type | Segment Descriptor Type |
|  |  |  |  |  |  | 4 - frames operand space |
| 326 | 1 | 0 | 35 | 36 | Location | Starting address of segment from base |

The segment descriptor format 306 shown in FIG. 13 is identical with the segment descriptor format shown in FIG. 11 with the exception that both the base 322 and the upper bound 324 for the segment are 10-bit values and are MOD 64 k (2**16) words. A segment framed by this type of descriptor extends from base+location through base+bound.

Figure 14:
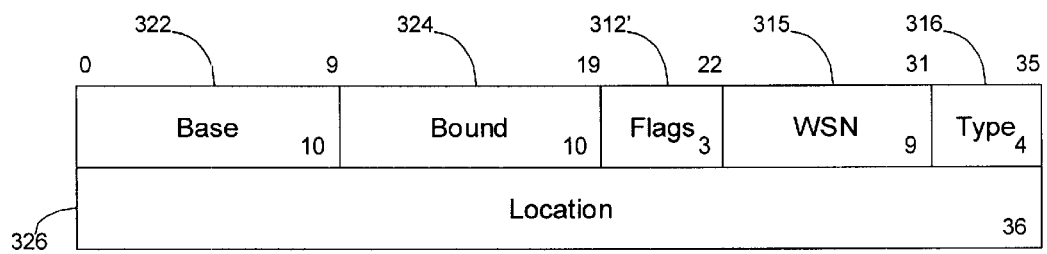

FIG. 14 is a diagram illustrating the segment register representation of a super segment descriptor containing a working space number in a preferred embodiment of the present invention. Super segment descriptors are utilized for segments larger than 256 k (2**18) words. The segment register representation 308 comprises two 36-bit words stored in two words of memory or in a single 72-bit register. The format of the segment register representation is shown in table T-7:

TABLE T-7

Super Segment Descriptor 308 Format

| Ref# | Wd | St | Ed | B# | Field Name | Field Description |
|------|----|----|----|----|------------|-------------------|
| 322 | 0 | 00 | 09 | 10 | Base | Base address of segment |
| 324 | 0 | 10 | 19 | 10 | Bound | Upper bound of segment |
| 312' | 0 | 20 | 22 | 3 | Flags | Flags |
| 315 | 0 | 23 | 31 | 9 | WSN | Working Space Number |
| 316 | 0 | 32 | 35 | 4 | Type | Segment Descriptor Type 6 - frames operand space |
| 326 | 1 | 0 | 35 | 36 | Location | Starting address of segment from base |

The segment descriptor format 308 shown in FIG. 14 combines the super segment descriptor format shown in FIG. 13 with the presence of a working space number 315 as shown in FIG. 12.

Figure 15:
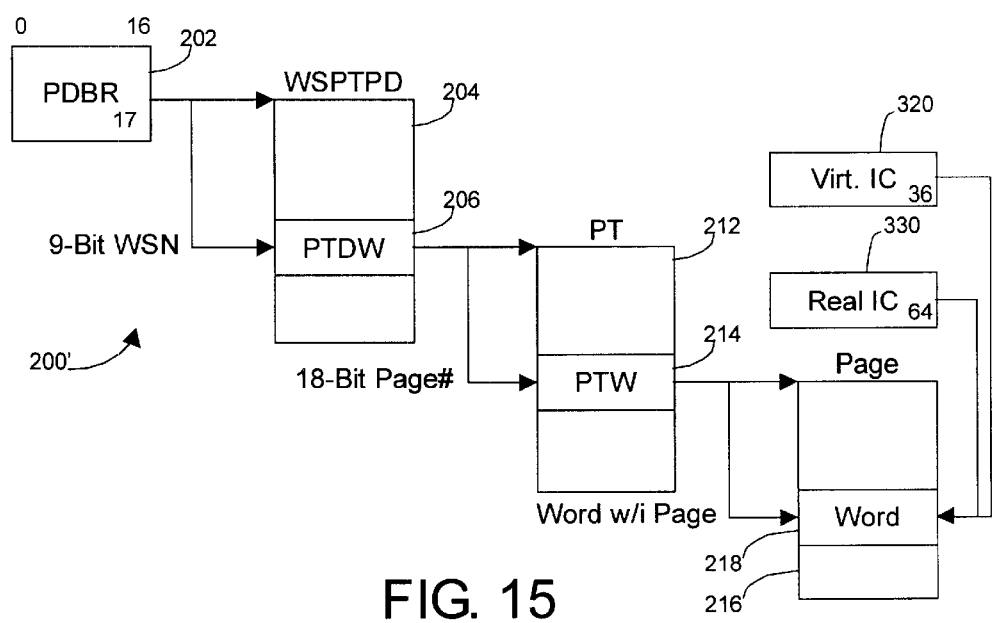
FIG. 15 is a block diagram that illustrates an improved virtual address mapping using a dense page table in the GCOS 8 architecture, in accordance with a preferred embodiment of the present invention.

FIG. 15 is a block diagram that illustrates an improved virtual address mapping 200' using a dense page table in the GCOS 8 architecture, in accordance with a preferred embodiment of the present invention. The tables shown in FIG. 15 are identical with the tables shown in FIG. 8. However, instead of starting with the effective address (EA) 114 and working down through the memory table hierarchy as shown in FIG. 8, the preferred embodiment utilizes two instruction counters (IC). A Virtual Address Instruction Counter 320 corresponds to the combined Instruction Counter (IC) and Instruction Segment (ISR) registers in the GCOS 8 architecture. In that environment, the IC register contains an 18-bit current instruction word address when in NS or ES modes, or a 36-bit current instruction word address when in EI mode. In both modes, the IC provides an offset to the segment descriptor in the ISR. In the preferred embodiment, the current Instruction Counter is maintained as a register in the Host system. In this situation, it is maintained as a word offset stored in a register of the size supported by the Host system. Note that when emulating other Target architectures, the Virtual Address Instruction Counter 320 may be a byte address. A Real Memory Address Instruction Counter 330 contains the real memory address of the instruction word as a Host memory address. This is either a word offset or byte offset, depending on the Host system architecture.

Whenever an instruction is fetched to execute by the emulator, the instruction is typically directly fetched utilizing the Real Memory Address Instruction Counter 330 to directly address the word 218 being fetched in the appropriate page 216. Later, the Virtual Address Instruction Counter 320 and the Real Memory Address Instruction Counter 330 are both incremented, as necessary, to take into account the size of the instruction previously fetched. Thus, for example, if a one word instruction is fetched, and the Virtual Address Instruction Counter 320 is maintained in terms of Target words, while the Real Memory Address Instruction Counter 330 is maintained in terms of Host bytes, with eight 8-bit bytes per 64-bit word, the Virtual Address Instruction Counter 320 would be incremented by one (1) while the Real Memory Address Instruction Counter 330 is incremented by eight (8). Similarly, fetching a two word instruction results in the instruction counters 320, 330 being incremented by two (2) and sixteen (16) respectively, while fetching a three-word instruction results in the instruction counters 320, 330 being incremented by three (3) and twenty-four (24), respectively.

In the preferred embodiment, the Virtual Address Instruction Counter 320 is maintained in units (words or bytes) most appropriate to the emulated or Target system, while the Real Memory Address Instruction Counter 330 is maintained in units (words or bytes) most appropriate to the Host or emulating system. Thus, if memory is addressed in bytes in the Host or emulating system, the Real Memory Address Instruction Counter 330 will be maintained in bytes also. Thus, it is within the scope of this invention for the Virtual Address Instruction Counter 320 to be incremented by one for each single word instruction fetched, if maintained in words, while the Real Memory Address Instruction Counter 330 is incremented by two (16-bit words), four (32-bit words), or eight (64-bit words), as appropriate, if maintained in bytes. Hereinbelow, both instruction counters 320, 330, will be assumed to be maintained in bytes.

The usage of two instruction counters 320, 330, one to maintain the Target virtual memory address for the instruction counter, and the other to maintain the Host real memory address for the instruction counter, substantially reduces the number of cycles necessary for virtual-to-real memory address translation. This is because it is not necessary to perform full virtual-to-real memory address translation for each instruction fetched. Rather, the full virtual-to-real memory address translation is performed when instruction flows to a new page 216 of memory. In the GCOS 8 environment, each page contains 1024 (210) words or 4096 (212) bytes, and thus may contain up to 1024 instructions. Pages in the IBM S/390 architecture have a similar size (4096 bytes). Thus, there is a high likelihood that sequential instruction flow will remain on any given page for a substantial number of executed instructions. Indeed, most program branches will also tend to remain on the same page as the branching instruction. The elimination of full virtual-to-real memory address translation in these instances more than compensates in cycles saved for the added instructions executed as a result of incrementing both of the instruction counters 320, 330 for each instruction fetched for execution.

Figure 16:
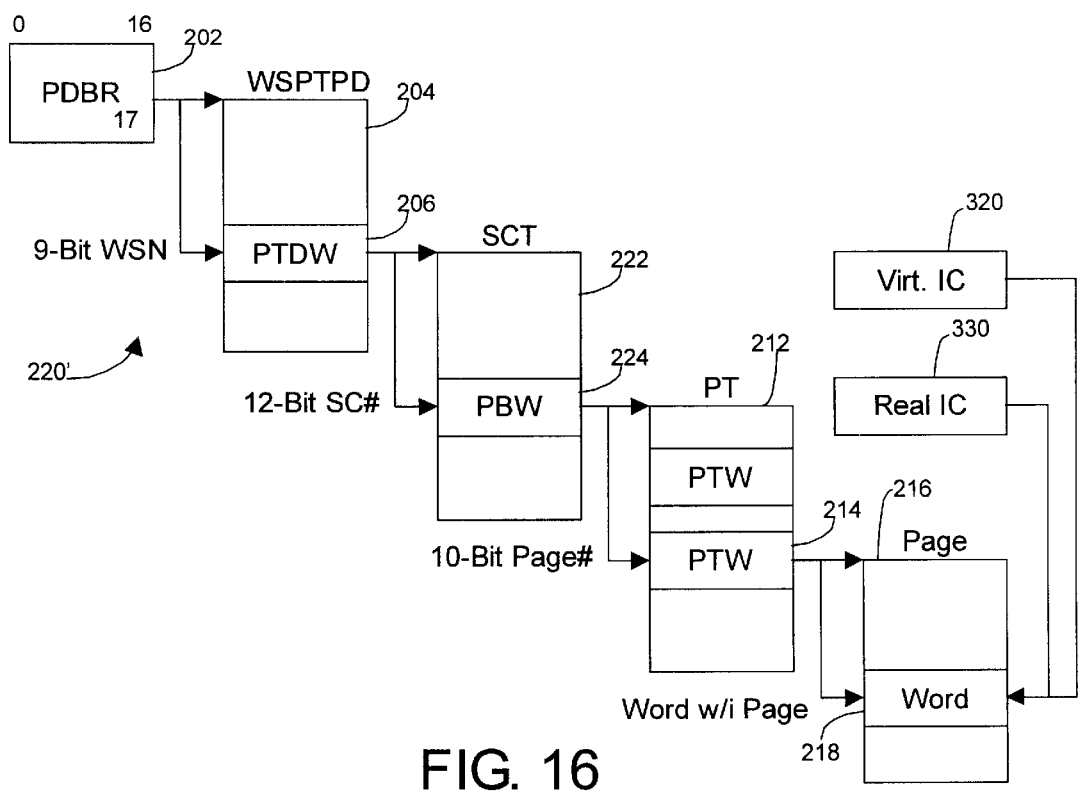
FIG. 16 is a block diagram that illustrates an improved virtual address mapping using a section table in the GCOS 8 architecture, in accordance with a preferred embodiment of the present invention.

FIG. 16 is a block diagram that illustrates an improved virtual address mapping 220' using a section table 222 in the GCOS 8 architecture, in accordance with a preferred embodiment of the present invention. The tables shown in FIG. 16 are identical with the tables shown in FIG. 10. However, instead of starting with the effective address (EA) 114 and working down through the memory hierarchy as shown in FIG. 10, the preferred embodiment utilizes the two instruction counters 320, 330 to directly index into the page table 216 containing the next instruction to be fetched for execution. This substantially reduces the number of cycles necessary for virtual-to-real memory address translation. As with the previous FIG., full virtual-to-real memory address translation is only required when fetching an instruction from a different page 216 of memory.

Figure 17:
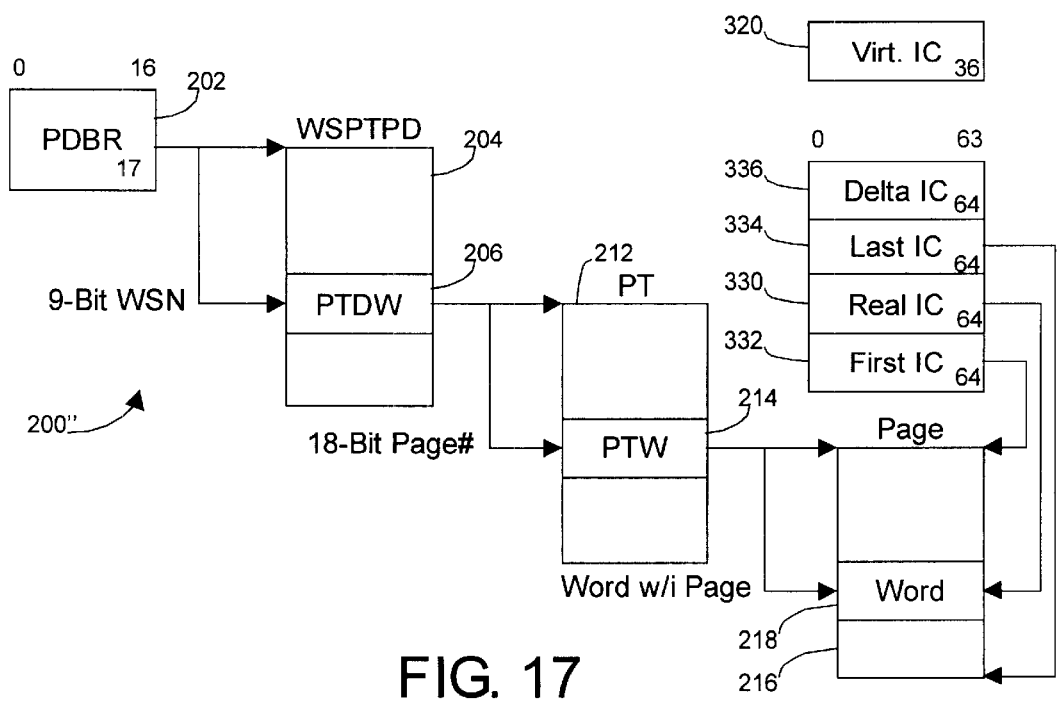
FIG. 17 is a block diagram that illustrates an improved virtual address mapping using a dense page table in the GCOS 8 architecture, in accordance with an alternate embodiment of the present invention.

FIG. 17 is a block diagram that illustrates an improved virtual address mapping 200" using a dense page table in the GCOS 8 architecture, in accordance with an alternate embodiment of the present invention. The tables shown in FIG. 17 are identical with the tables shown in FIG. 15, with the exceptions discussed below. Instead of utilizing two different instruction counters 320, 330, this alternate embodiment utilizes a Real Memory Address Instruction Counter 330 and a Delta Instruction Counter 336. While on any given page 216, the arithmetic difference between the Real Memory Address Instruction Counter 330 and the Virtual Address Instruction Counter 320 is constant. Thus, if:

$$\text{Delta\_IC} = \text{Virtual\_IC} - \text{Real\_IC} \quad (1)$$

Then by necessity:

$$\text{Virtual\_IC} = \text{Delta\_IC} + \text{Real\_IC} \quad (2)$$

The result is that instead of incrementing both the Virtual Address Instruction Counter 320 and the Real Memory Address Instruction Counter 330, only one of the instruction counters 320, 330 (preferably the Real Memory Address Instruction Counter 330) needs to be incremented for each instruction executed, while providing for efficient computation of the other instruction counter 330, 320 (preferably the Virtual Address Instruction Counter 320) whenever needed.

Note here that the conversion from Virtual_IC to Real_IC and back shown here implies that both instruction counters have the same units, such as either both are in terms of words or both are in terms of bytes. In many cases, including emulating the GCOS 8 architecture on a byte addressable Host architecture, it is necessary to convert from words to bytes and back. This can typically be done efficiently by utilizing shift instructions.

In this alternate embodiment, if there are sufficient registers available in the emulating or Host computer system, both the Real Memory Address Instruction Counter 330 and the Delta Instruction Counter 336 variables are maintained in registers. This is especially important for the Real Memory Address Instruction Counter 330 since it is utilized on all instruction fetches for straight-line code sequences. It should be noted that when emulating a 36-bit GCOS 8 architecture on an architecture with a wider word size, such as a 64-bit RISC, VLIW, or EPIC architecture, both the Real Memory Address Instruction Counter 330 and the Delta IC 336 are maintained in the wider word size.

In this alternate embodiment, two bound variables are also utilized, and preferably maintained in registers, if the emulating or Host system has a register-rich architecture. A First IC 332 variable/register contains the real memory address of the first legal address on the current page of instructions 216. A Last IC 334 variable/register contains the real memory address of the last legal address on the current page of instructions 216 (or alternatively, the first illegal address above the highest legal address). In the GCOS 8 environment, the vast majority of the time these two bound variables/registers 332, 334 contain the first and last word addresses of the current page of instructions 216. However, it is possible that a segment descriptor may only frame a part of a page 216, and in that situation, the two bound variables/registers 332, 334 are modified accordingly (see Equations 8 and 9 below).

Figure 18:
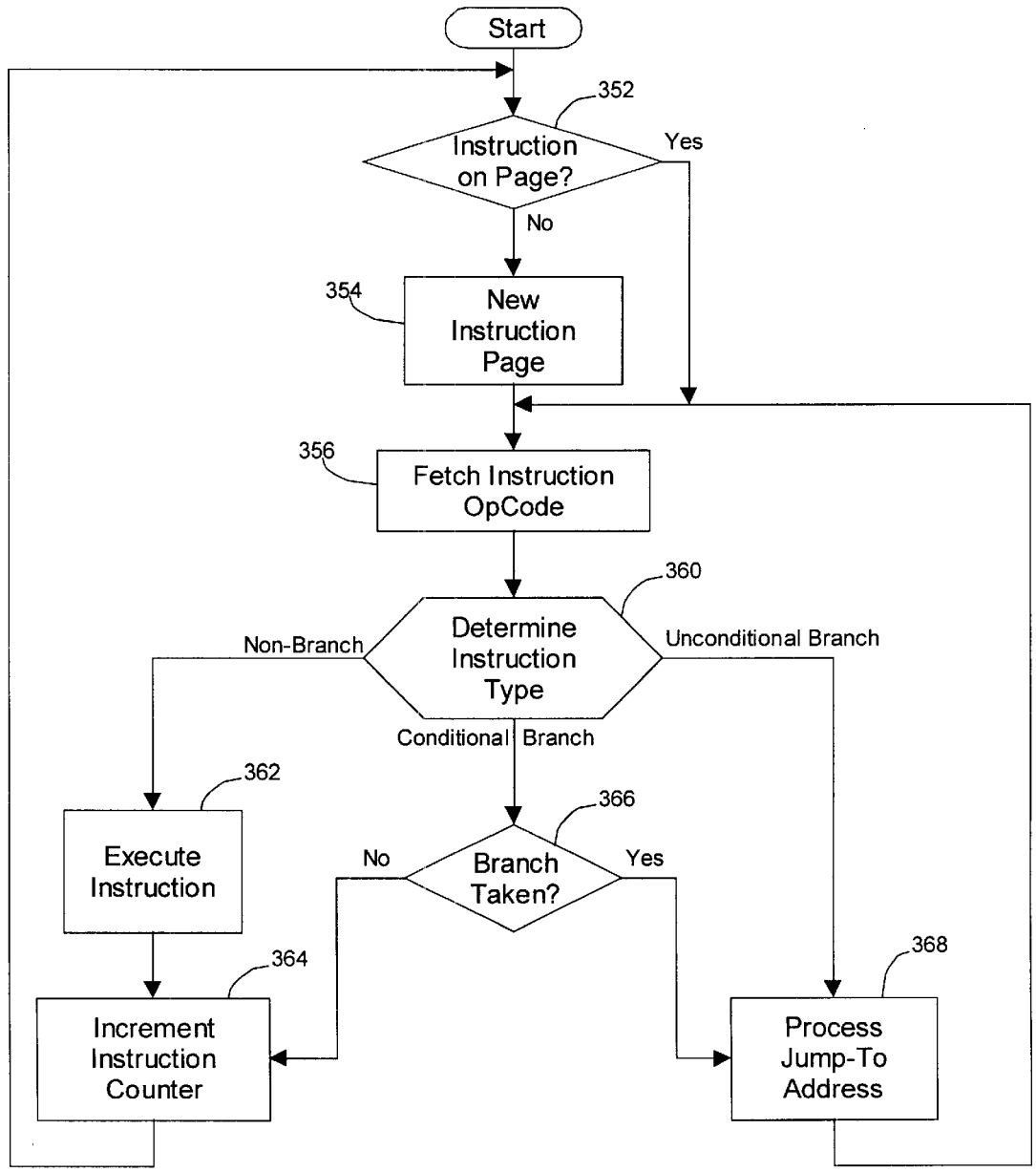
FIG. 18 is a flowchart illustrating program flow in an emulator utilizing the additional variables/registers shown in FIG. 17.

FIG. 18 is a flowchart illustrating program flow in an emulator utilizing the additional variables/registers shown in FIG. 17. The emulator operates essentially as an infinite loop. The loop is entered from an initializing environment and a test is made whether the next (which in this case is the first) instruction is on the current page of instructions, step 252. This test can be optimized by testing the Real Memory Address Instruction Counter 330 against the Last IC 334 variable/register. It is typically not necessary to test against the First IC 332 variable/register since the instruction counter is being incremented in a forward direction. If the test against the Last IC 334 fails, the instruction counter is either no longer on the current page of instructions, or it is no longer within the instruction segment descriptor's bounds. In either case, New Instruction Page 354 code is executed (see FIG. 19), step 354. Upon normal return from the New Instruction Page 354 code, the Real Memory Address Instruction Counter 330, the First IC 332, Last IC 334, and Delta IC 336 variables/registers have been updated to address the current page.

After returning from executing the New Instruction Page 354, if necessary, the next instruction is fetched, step 356. The OPcode from the fetched instruction is isolated and evaluated. The emulator then branches based on the OPcode of the instruction just fetched. Three different types of instructions are shown in this FIG. This is done for simplicity. In a preferred implementation of this method, the OPcode is utilized as a branch index, and each instruction, or group of instructions is treated separately. The three different types of instructions are illustrative.

If a non-branch instruction is decoded, step 360, it is executed, step 362. The Real Memory Address Instruction Counter 330 is incremented, and the infinite loop is repeated, starting with the test whether the Real Memory Address Instruction Counter 330 is less than the Last IC 334 value, step 352. Note here that a single word instruction is assumed. The GCOS 8 architecture also supports two (2) and three (3) word instructions. In such cases, the Real Memory Address Instruction Counter 330 is incremented appropriately. However, note that special processing is called for to take care of the situation where the instruction crosses page boundaries.

If an unconditional branch instruction is decoded, step 360, the instruction operand is prepared and treated as a "jump-to" address. The jump-to address is processed as the new instruction count (IC) value (see FIG. 19), step 368. The loop is then repeated, starting with the instruction fetch, step 356.

The third alternative is when the instruction decoded is a conditional branch instruction, step 360. In that case, the branching condition is evaluated, and a decision is made whether or not to branch, step 366. If the branch is taken, the conditional branch instruction is treated like an unconditional branch instruction, with the branch operand being treated as the new Jump-To Instruction Counter address, step 368. Otherwise, when the branch is not taken, the instruction is treated like a completed sequential instruction. The Real Memory Instruction Counter 330 is incremented, and the loop is then repeated, starting with the test whether the Real Memory Address Instruction Counter 330 is less than the Last IC 334 value, step 352.

The method shown in FIG. 18 greatly reduces the number of instructions executed during program emulation. Partly this is because in normal sequential execution of code, the instruction counter increments until changed through some type of branch instruction. In most code sequences, in particular outside the operating system (OS), the number of sequential instructions executed greatly outnumber the number of branch instructions executed.

Figure 19:
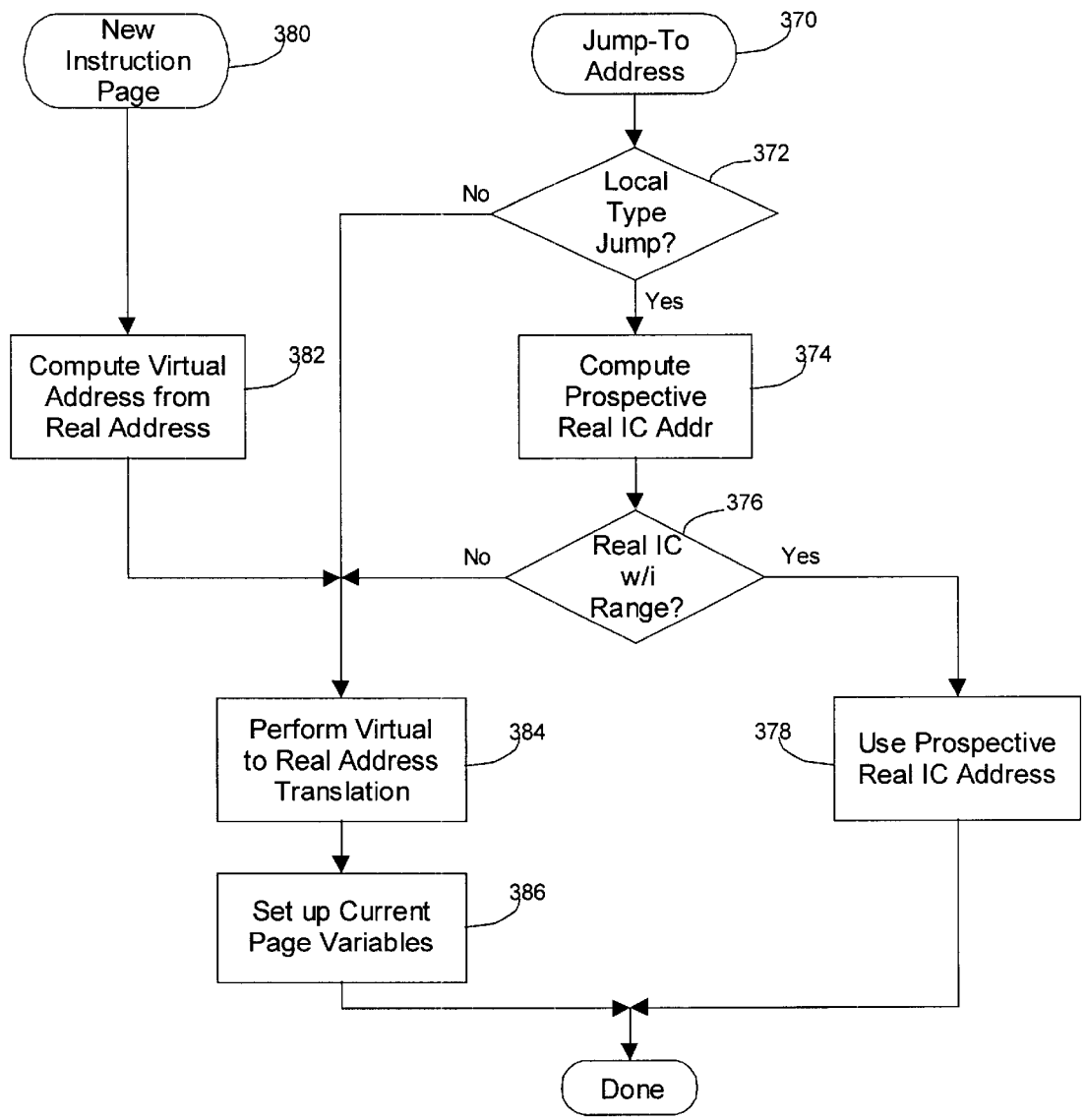
FIG. 19 is a flowchart illustrating the Process Jump-To Address and the New Instruction Page code shown in FIG. 18.

FIG. 19 is a flowchart illustrating the Process Jump-To Address, step 368, and the New Instruction Page, step 354, code shown in FIG. 18. The Jump-To Address code starts, step 370, by testing whether the jump instruction is a local type of jump or not, step 372. In some architectures, local jump or branch instructions have a different OPcode than instructions with equivalent functionality but a non-local branch address. In particular, note that some instructions, such as subroutine linkage instructions, are more likely to branch to other pages than other branch instructions. In this FIG. 19, a test is shown whether this is a local jump or not, step 372.

If the jump is of a type that is very likely to be a branch to an address on the same page, step 372, a prospective Real Memory Address Instruction Counter value is computed by subtracting (or adding as necessary) the Delta IC value 336 to the effective Virtual Memory Address Instruction Counter value generated from the branch instruction operand:

$$\text{Prospective\_Real\_IC} = \text{Virtual\_IC} - \text{Delta\_IC} \qquad (3)$$

The prospective Real Memory Address Instruction Counter value is compared to the First_IC 332 and Last_IC 334 values to determine whether the resulting Real Memory Address Instruction Counter points to an instruction on the current page of instructions or not, step 376. If the prospective Real Memory Address Instruction Counter value is on the current instruction page, step 376, it is used as the actual Real Memory Address Instruction counter 330:

$$\text{Real\_IC} = \text{Propspective\_Real\_IC} \qquad (4)$$

This optimization is especially useful in Target architectures supporting local jumps. However, in many Target architectures it may be difficult to determine in advance whether a certain type of jump is very likely to be a branch to an address on the same page. In these situations, this optimization may not be as useful.

Otherwise, the virtual address is not on the current instruction page. In that situation, Virtual-to-Real Memory Address Translation is performed for the jump-to address specified in the instruction operand, step 384. The current page bound variables or registers are updated, step 386, to delimit the current page:

$$\text{Delta\_IC} = \text{Virtual\_IC} - \text{Real\_IC} \qquad (5)$$

$$\text{Page\_First} = \text{Real\_IC} - (\text{Real\_IC AND (PAGESIZE- 1)}) \qquad (6)$$

$$\text{Page\_Last} = \text{Page\_First} + \text{PAGESIZE} \qquad (7)$$

$$\text{First\_IC} = \text{MAX}(\text{Page\_First}, \text{Segment\_Base} + \text{Delta\_IC}) \qquad (8)$$

$$\text{Last\_IC} = \text{MIN}(\text{Page\_Last}, \text{Segment\_Bound} + \text{Delta\_IC}) \qquad (9)$$

Note that Equation (6) shows computation of the first real memory address on a page of instructions (Page_First). This calculation can be typically eliminated here since that value is usually created as an intermediate result in virtual-to-real memory address translation. The real memory address is typically created from a page table word 214 by first computing this (Page_First) value, then merging (ORing) the word offset 186 and byte offset 187 into this value (see FIGS. 7 & 9).

The page limit (Page_Last) is shown in Equation (7) as the first illegal real memory address beyond the current page of instructions. The last legal real memory address on the current page of instructions can be used instead, and can be efficiently computed either by adding, or ORing a value equal to (PAGESIZE–1) to the Page_First value. The determination of which of these two values is more optimal as a limit depends on the interplay between the architectures of both the Host and Target systems.

Finally note that in architectures without segments, Equations (8) and (9) can be eliminated, with the First_IC 332 variable/register being set to the Page_First value and the Last_IC 334 variable/register being set to the Page_Last value.

Continuing with the flowchart in FIG. 19, the New Instruction Page code, step 354, is executed whenever a Real Memory Address Instruction Counter value is tested, step 352 (see FIG. 18), and determined not to be within the current page of instructions. This will typically happen when sequential program flow runs from one real memory page onto the next. At this point, the Real Memory Address Instruction Counter 330 value is no longer valid. The corresponding Virtual Memory Address Instruction Counter value is computed, step 382, as noted before in Equation (2) by:

$$\text{Virtual\_IC} = \text{Delta\_IC} + \text{Real\_IC} \qquad (2)$$

Virtual-to-real memory address translation is then performed on this Virtual Memory Address Instruction Counter value, step 384, and the Current Page variables are set up (see Equations (5) through (9) above), step 386. Note that this later portion of the flowchart is shared with the Jump-To Address entry, step 370.

In conclusion, the overhead of emulating a Target computer system having virtual memory can be significantly reduced if full virtual-to-real memory address translation can be avoided as often as possible. The most heavily utilized virtual-to-real memory address translation performed in an emulator supporting virtual memory is typically translation of the Instruction Counter. This is because that variable or register value is utilized to fetch each instruction to be decoded and executed. As long as execution remains on any given page, virtual-to-real memory address translation can be avoided by either maintaining and incrementing both a Virtual Memory Address Instruction Counter 320 and a Real Memory Address Instruction Counter 330, or maintaining and incrementing a Real Memory Address Instruction Counter 330, while maintaining a Delta IC value that can be utilized to quickly and efficiently compute a Virtual Memory Address Instruction Counter value corresponding to any given Real Memory Address Instruction Counter 330 value. Performance of such an emulator is substantially increased by the elimination of Virtual-to-Real memory address translations for fetching second and subsequent instructions on any given page of instructions.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. A method of emulating a Target computer system on a Host computer system, wherein:

the Target computer system supports a virtual memory mapped in a plurality of real memory pages containing a first real memory page and a second real memory page, and said method comprises:
  A) fetching a Target instruction from the first real memory page utilizing a real memory address instruction counter to address the first real memory page;
  B) incrementing the real memory address instruction counter to account for the Target instruction fetched in step (A); and
  C) emulating the Target instruction fetched in step (A);
  D) testing whether the real memory address instruction counter is within the first real memory page before step (A); and
  E) performing a virtual-to-real address translation to initialize the real memory address instruction counter to an address in the second memory page when the test in step (D) fails.

2. A method of emulating a Target computer system on a Host computer system, wherein the Target computer system supports a virtual memory mapped in a plurality of real memory pages containing a first real memory page and a second real memory page, and said method comprises:
- A) fetching a Target instruction from the first real memory page utilizing a real memory address instruction counter to address the first real memory page;
- B) incrementing the real memory address instruction counter to account for the Target instruction fetched in step (A);
- C) emulating the Target instruction fetched in step (A); and
- D) incrementing a virtual address instruction counter to account for the Target instruction fetched in step (A).

3. The method in claim 2 which further comprises:
- E) testing whether the real memory address instruction counter is within the first real memory page before step (A); and
- F) performing a virtual-to-real address translation utilizing the virtual address instruction counter to initialize the real memory address instruction counter to an address in the second memory page when the test in step (E) fails.

4. The method in claim 2 wherein:

the real memory address instruction counter is maintained in a first Host register, and the virtual address instruction counter is maintained in a second Host register.

5. The method in claim 4 wherein:

the first Host register and the second Host register are incremented substantially in parallel.

6. A method of emulating a Target computer system on a Host computer system, wherein the Target computer system supports a virtual memory mapped in a plurality of real memory pages containing a first real memory page and a second real memory page, and said method comprises:
- A) fetching a Target instruction from the first real memory page utilizing a real memory address instruction counter to address the first real memory page;
- B) incrementing the real memory address instruction counter to account for the Target instruction fetched in step (A); and
- C) emulating the Target instruction fetched in step (A), wherein step (C) comprises:
  1) processing a jump-to address if the Target instruction fetched in step (A) is an unconditional jump instruction, wherein substep (1) comprises:
     a) if the Target instruction is likely a local jump, then performing a set of substeps comprising:
        i) computing a prospective instruction counter real memory pointer,
        ii) testing whether the prospective real memory address instruction counter is on the first real memory page,
        iii) utilizing the prospective real memory address instruction counter as the real memory address instruction counter when the prospective real memory address instruction counter is determined to be on the first real memory page, and
        iv) setting the real memory address instruction counter to an address in the second memory page by performing a virtual-to-real address translation when the prospective real memory address instruction counter is determined to not be on the first real memory page.

7. The method in claim 6 wherein substep (1) further comprises:
- b) setting the real memory address instruction counter to an address in the second memory page by performing the virtual-to-real address translation when the instruction is likely not a local jump.

8. A method of emulating a Target computer system on a Host computer system, wherein the Target computer system supports a virtual memory mapped in a plurality of real memory pages containing a first real memory page and a second real memory page, and said method comprises:
- A) fetching a Target instruction from the first real memory page utilizing a real memory address instruction counter to address the first real memory page;
- B) incrementing the real memory address instruction counter to account for the Target instruction fetched in step (A);
- C) emulating the Target instruction fetched in step (A); and
- D) computing a delta value between the real memory address instruction counter and a virtual address instruction counter address.

9. The method in claim 8 wherein step (D) comprises:
1) adjusting the virtual address instruction counter address to compensate for a difference in units between the virtual address instruction counter address and the real memory address instruction counter, and
2) computing a difference between the virtual address instruction counter address and the real memory address instruction counter.

10. The method in claim 8 wherein step (D) comprises:
1) adjusting the real memory address instruction counter to compensate for a difference in units between the virtual address instruction counter address and the real memory address instruction counter, and
2) computing a difference between the virtual address instruction counter address and the real memory address instruction counter.

11. The method in claim 8 which further comprises:
- E) testing whether the real memory address instruction counter is within the first real memory page before step (A).

12. The method in claim 11 wherein:

step (E) comprises:
1) comparing the real memory address instruction counter against a last instruction counter value, and said method further comprising:
- F) setting the last instruction counter value to an end of the first real memory page.

13. The method in claim 12 wherein:

step (E) further comprises:
2) comparing the real memory address instruction counter against a first instruction counter value, and said method further comprising:
- G) setting the first instruction counter value to a start of the first real memory page.

14. The method in claim 11 wherein:

step (E) comprises:
1) comparing the real memory address instruction counter against a last instruction counter value, and said method further comprising:
F) computing an end of segment address relative to the first real memory page; and
G) setting the last instruction counter value to the end of segment address relative to the first real memory page.

15. The method in claim 11 wherein:

step (E) comprises:
1) comparing the real memory address instruction counter against a last instruction counter value, and said method further comprising:
F) computing an end of segment address relative to the first real memory page; and
G) setting the last instruction counter value to the lessor of an end of the first real memory page and the end of segment address relative to the first real memory page.

16. Target emulation software stored in a Computer Software Storage Medium on a Host computer system for emulating a Target computer system, wherein:

the Target computer system supports a virtual memory mapped in a plurality of real memory pages containing a first real memory page and a second real memory page, and said Target emulation software comprises:
A) a set of computer instructions for fetching a Target instruction from the first real memory page utilizing a real memory address instruction counter to address the first real memory page;
B) a set of computer instructions for incrementing the real memory address instruction counter to account for the Target instruction fetched in set (A);
C) a set of computer instructions for emulating the Target instruction fetched in set (A); and
D) incrementing a virtual address instruction counter to account for the Target instruction fetched in step (A).

17. A Non-Volatile Storage Medium containing Target emulation software that is executable on a Host computer system for emulating a Target computer system, wherein:

the Target computer system supports a virtual memory mapped in a plurality of real memory pages containing a first real memory page and a second real memory page, and said Target emulation software comprises:
A) a set of computer instructions for fetching a Target instruction from the first real memory page utilizing a real memory address instruction counter to address the first real memory page;
B) a set of computer instructions for incrementing the real memory address instruction counter to account for the Target instruction fetched in set (A); and
C) a set of computer instructions for emulating the Target instruction fetched in set (A); and
D) a set of computer instructions for incrementing a virtual address instruction counter to account for the Target instruction fetched in set (A).

18. Target emulation software stored in a Computer Software Storage Medium on a Host computer system for emulating a Target computer system, wherein:

the Target computer system supports a virtual memory mapped in a plurality of real memory pages containing a first real memory page and a second real memory page, and said Target emulation software comprises:
A) a set of computer instructions for fetching a Target instruction from the first real memory page utilizing a real memory address instruction counter to address the first real memory page;
B) a set of computer instructions for incrementing the real memory address instruction counter to account for the Target instruction fetched in set (A);
C) a set of computer instructions for emulating the Target instruction fetched in set (A); and
D) a set of computer instructions for computing a delta value between the real memory address instruction counter and a virtual address instruction counter address.

19. A Non-Volatile Storage Medium containing Target emulation software that is executable on a Host computer system for emulating a Target computer system, wherein:

the Target computer system supports a virtual memory mapped in a plurality of real memory pages containing a first real memory page and a second real memory page, and said Target emulation software comprises:
A) a set of computer instructions for fetching a Target instruction from the first real memory page utilizing a real memory address instruction counter to address the first real memory page;
B) a set of computer instructions for incrementing the real memory address instruction counter to account for the Target instruction fetched in set (A);
C) a set of computer instructions for emulating the Target instruction fetched in set (A); and
D) a set of computer instructions for computing a delta value between the real memory address instruction counter and a virtual address instruction counter address.

* * * * *